United States Patent Office 3,325,505
Patented June 13, 1967

3,325,505
4-CYCLOALKYL(OR CYCLOALKENYL)-
DIHYDROPYRIDINES
Bernard Loev, Broomall, Pa., assignor to Smith Kline &
French Laboratories, Philadelphia, Pa., a corporation
of Pennsylvania
No Drawing. Filed Feb. 24, 1965, Ser. No. 435,072
6 Claims. (Cl. 260—295.5)

This invention relates to new 4-cycloalkyl(or cycloalkenyl)-dihydropyridines having pharmacodynamic activity. In particular, the compounds of this invention have hypotensive activity.

The compounds of this invention are represented by the following formula:

FORMULA I

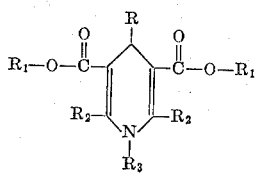

when:

R is cycloalkyl or cycloalkenyl;
$R_1$ and $R_2$ are lower alkyl and
$R_3$ is hydrogen or lower alkyl.

Preferred compounds of this invention are represented by the following formula:

FORMULA II

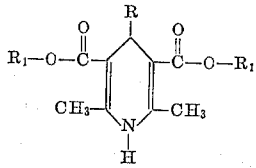

when:

R is cyclohexyl or 3-cyclohexenyl and
$R_1$ is lower alkyl.

Particularly advantageous compounds of this invention having hypotensive activity on oral administration are represented by the following formulas:

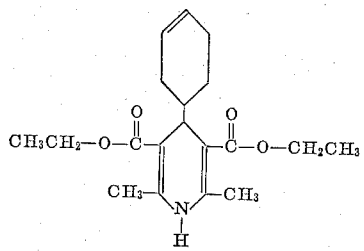

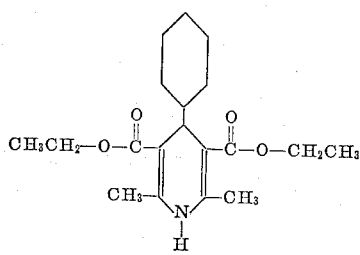

The terms "cycloalkyl" and "cycloalkenyl" where used herein denote groups having 5-6 carbon atoms and the term "lower alkyl" denotes groups having 1-4 carbon atoms, advantageously 2 carbon atoms.

The compounds of this invention of Formula I in which $R_3$ is hydrogen are prepared according to the following procedure:

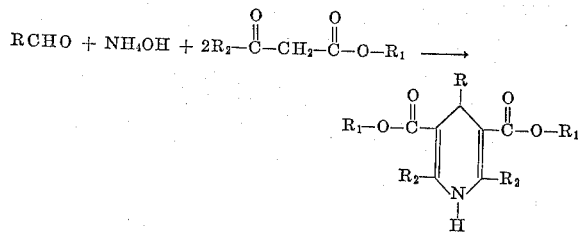

The terms R, $R_1$ and $R_2$ are as defined above.

By the above procedure the compounds of this invention are prepared by reacting one molar equivalent of a cycloalkane(or cycloalkene)carboxaldehyde with two molar equivalents of a lower alkyl ester of an alkanoylacetic acid and an excess of ammonium hydroxide. The reaction is preferably carried out in a lower alkanol solvent at elevated temperature, conveniently at reflux temperature, for about 1 to 4 hours. On pouring the reaction mixture into ice water the product separates.

Alternatively, the compounds of Formula I are prepared by reacting one molar equivalent of a cycloalkane (or cycloalkene)carboxaldehyde with two molar equivalents of a lower alkyl ester of a β-amino-α,β-unsaturated alkanoic acid of the formula:

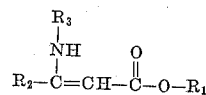

in which $R_1$, $R_2$ and $R_3$ are as defined above. The reaction is carried out at elevated temperature, conveniently at reflux temperature. On cooling the reaction mixture and pouring into water, the product separates.

Also, the compounds of Formula I are prepared by reacting one molar equivalent of a cycoalkane(or cycloalkene)carboxaldehyde with one molar equivalent of a lower alkyl ester of an alkanoylacetic acid and one molar equivalent of a lower alkyl ester of a β-amino-α,β-unsaturated alkanoic acid at elevated temperature.

The compounds of this invention of Formula I in which $R_3$ is lower alkyl are prepared according to the following procedure:

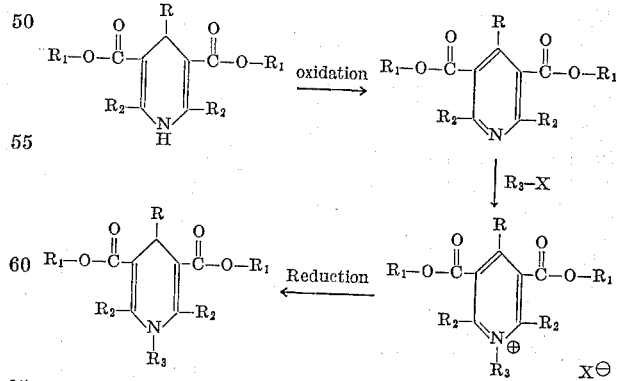

The terms R, $R_1$ and $R_2$ are as defined above.

In the above reaction, the oxidation of the dihydropyridine is carried out with an oxidizing agent such as a nitrous oxide, nitrous acid, hydroxylamine, hydrogen peroxide, oxygen, etc. The resulting pyridine compound is quaternized by using any suitable alkyl ester such as methyl iodide, ethyl sulfate, butyl methane sulfonate and the like. The resulting quaternary salt is reduced by catalytic hydrogenation or by using a chemical reducing agent such as sulfur dioxide or sodium hydrosulfite to give principally the 1,4-dihydropyridine or sodium borohydride to give principally the 1,2-dihydropyridine.

Although the compounds of this invention are drawn as having the 1,4-dihydropyridine structure, the positions of the double bonds are not known with certainty in all instances and thus it is understood that the compounds of this invention may have the following 1,2-dihydro structure:

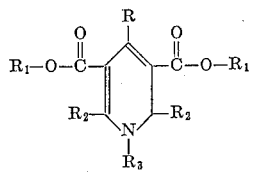

The terms R, $R_1$, $R_2$ and $R_3$ are as defined above.

The following examples are not limiting but are illustrative of the compounds of this invention and of methods of preparation.

*Example 1*

A solution of 22.0 g. of 3-cyclohexenecarboxaldehyde, 52.0 g. of ethyl acetoacetate, 40 ml. of ethanol and 20 ml. of concentrated ammonium hydroxide is heated at reflux for two hours. The solution is cooled and poured into 500 ml. of ice water. Filtering and recrystallizing the solid material from cyclohexane-hexane gives 4-(3-cyclohexenyl)-3,5-dicarbethoxy-1,4-dihydrolutidine, M.P. 139–140° C.

*Example 2*

To a solution of 20 g. of cyclohexanecarboxaldehyde and 46.4 g. of ethyl acetoacetate in 50 ml. of ethanol is added 25 ml. of concentrated ammonium hydroxide. After one hour, the solution is refluxed for three hours, cooled, diluted with water and allowed to stand. Filtering and recrystallizing the solid material from hexane gives 4-cyclohexyl-3,5-dicarbethoxy-1,4-dihydrolutidine, M.P. 128–130° C.

*Example 3*

A solution of 11 g. of 3-cyclohexenecarboxaldehyde, 32 g. of t-butyl acetoacetate and 10 ml. of ammonia in 50 ml. of ethanol is heated at reflux for 18 hours. The solution is cooled and poured into water. Filtering and recrystallizing the solid material from methanol gives 4-(3-cyclohexenyl)-3,5-di-t-butoxycarbonyl-1,4-dihydrolutidine, M.P. approximately 182° C.

*Example 4*

To a mixture of 50 g. of 4-(3-cyclohexenyl)-3,5-dicarbethoxy-1,4-dihydrolutidine (prepared as in Example 1), in 500 ml. of acetic acid is added 50 g. of sodium nitrite in portions with stirring. The solution is heated until the evolution of nitrogen oxide fumes ceases. The solution is poured into 3 l. of water. The oil which separates is extracted with ether and the extract is rinsed with dilute base and then with water, then dried and concentrated to give 4-(3-cyclohexenyl)-3,5-dicarbethoxylutidine.

A mixture of 35.4 g. of the above prepared lutidine and 15.1 g. of dimethyl sulfate is heated on a steam bath for 15 hours. After cooling, the semi-solid is stirred with ether and filtered. The resulting solid quaternary salt (32.4 g.) in a concentrated aqueous solution is added to a solution of 67.2 g. of sodium hydrosulfite and 74.7 g. sodium carbonate in 450 ml. of water. The mixture is stirred under nitrogen atmosphere for two hours. The mixture is extracted with ether, washed with water, dried and concentrated. The residue is recrystallized from methanol to give 4-(3-cyclohexenyl)-3,5-dicarbethoxy-1-methyl-1,4-dihydrolutidine. Alternatively, dissolving 10 g. of the quaternary salt in 100 ml. of 40% ethanol, adding 10 g. of sodium carbonate and 2 g. of sodium borohydride gives a mixture containing 4-(3-cyclohexenyl)-3,5-dicarbethoxy-1-methyl-1, 4-dihydrolutidine and principally the corresponding 1,2-dihydro compound.

Similarly, using in place of dimethyl sulfate, 15.0 g. of ethyl bromide, 16.5 g. of propyl bromide or 18.0 g. of n-butyl bromide in the above procedure using soduim hydrosulfite to reduce the quaternary salt the following products, respectively, are obtained:

4 - (3 - cyclohexenyl) - 3,5 - dicarbethoxy-1-ethyl-1, 4-dihydrolutidine,

4 - (3 - cyclohexenyl) - 3,5 - dicarbethoxy - 1-propyl-1,4-dihydrolutidine and

4 - (3 - cyclohexenyl) - 3, 5 - dicarbethoxy - 1-n-butyl-1,4-dihydrolutidine.

*Example 5*

Cyclohexen-2-one (4.8 g.) is condensed by the Darzens procedure, "Organic Reactions," Vol. 5:413 (John Wiley & Sons, Inc., New York, 1949), with 5.4 g. of methyl α-chloropropionate in 30 ml. of ether, using 4.5 g. sodium methoxide as condensing agent, to form methyl α-methyl-α,β-epoxycyclohex-2-enylideneacetate. This ester is hydrolyzed by stirring with 4.0 g. of sodium hydroxide in 40% aqueous solution for 18 hours at 50° C., then the solution is made strongly acidic and steam distilled to give 2-cyclohexenecarboxaldehyde.

A mixture of 3.7 g. of 2-cyclohexenecarboxaldehyde and 8.6 g. of methyl β-aminoβ-ethylacrylate is heated on a steam bath for 18 hours. Cooling, filtering and recrystallizing the solid product from methanol gives 4-(2-cyclohexenyl) - 2,6 - diethyl-3,5-dicarbomethoxy-1,4-dihydropyrimidine.

*Example 6*

A mixture of 11.0 g. of 1-cyclohexenecarboxaldehyde, 26.0 g. of ethyl acetoacetate, 10 ml. of concentrated ammonium hydroxide and 20 ml. of ethanol is heated at reflux for three hours. Working up as in Example 1 gives 4-(1-cyclohexenyl)-3,5-dicarbethoxy- 1,4-dihydrolutidine.

*Example 7*

A mixture of 11.2 g. of cyclohexanecarboxaldehyde, 37.2 g. of propyl valerylacetate, 10 ml. of concentrated ammoniu mhydroxide and 25 ml. of ethanol is heated at reflux for two hours. Working up as in Example 1 gives 4 - cyclohexyl - 3,5 - dicarbopropoxy - 2,6-di-n-butyl-1,4-dihydropyridine.

*Example 8*

A mixture of 9.6 g. of 3-cyclopentenecarboxaldehyde and 25.8 g. of ethyl β-aminocrotonate is heated on a steam bath for 16 hours. Working up as in Example 5 gives 4 - (3-cyclopentenyl)2,6-dimethyl-3,5-dicarbethoxy-1,4-dihydropyridine.

Similarly using 9.8 g. of cyclopentane-1-carboxaldehyde in the above reaction the product is 4-cyclopentyl-3, 5-dicarbethoxy-2,6-dimethyl-1,4-dihydropyridine.

By the same procedure using 9.6 g. of 2-cyclopentenecarboxaldehyde (prepared from cyclopenten-2-one by the procedure of Example 5) in the above reaction 4-(2-cyclopentyl) - 2,6 - dimethyl-3,5-dicarbethoxy-1,4-dihydropyridine is obtained.

*Example 9*

Methyl β-methylaminocrotonate (prepared from 8.2 g. methylamine in 15 ml. of water and 23.2 g. of methyl acetoacetate) is dissolved in acetic acid and treated with 11.0 g. of 3-cyclohexenecarboxaldehyde. The mixture is refluxed for ½ hour, then poured into water. On stirring the resulting oil crystallizes and is filtered and recrystallized from methanol to give 4-(3-cyclohexenyl)-3,5-dicarbomethoxy-1-methyl-1,4-dihydrolutidine.

What is claimed is:
1. A compound of the formula:

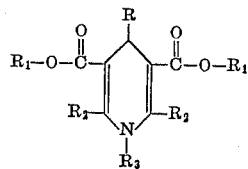

in which:
R is a member selected from the group consisting of cycloalkyl having 5-6 carbon atoms and cycloalkenyl having 5-6 carbon atoms;
$R_1$ and $R_2$ are lower alkyl; and
$R_3$ is a member selected from the group consisting of hydrogen and lower alkyl.

2. A compound of the formula:

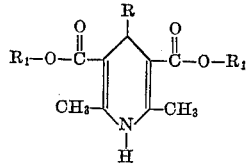

in which:
R is cyclohexenyl and
$R_1$ is lower alkyl.

3. A compound of the formula:

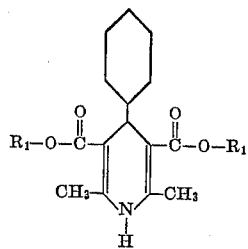

in which $R_1$ is lower alkyl.

4. A compound of the formula:

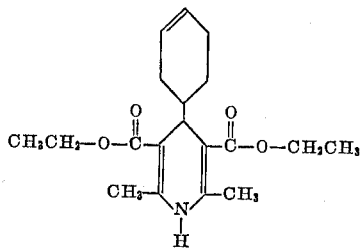

5. A compound of the formula:

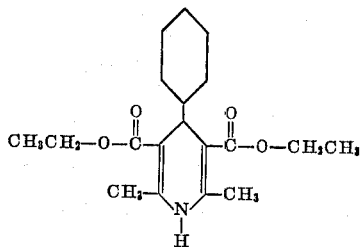

6. A compound of the formula:

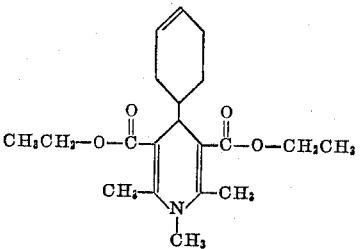

References Cited

Cardani et al.: Chem. Abstracts, vol. 48, par. 4534 (1954).

WALTER A. MODANCE, *Primary Examiner.*
NORMA S. MILESTONE, *Examiner.*
ALAN L. ROTMAN, *Assistant Examiner.*